No. 777,022. PATENTED DEC. 6, 1904.
I. G. HOWELL.
HORSESHOE.
APPLICATION FILED JULY 11, 1904.
NO MODEL.
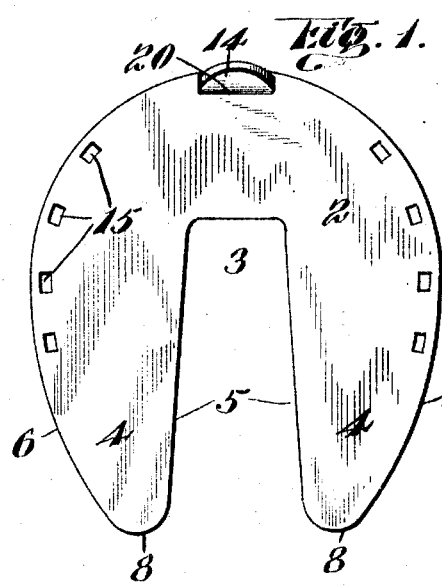
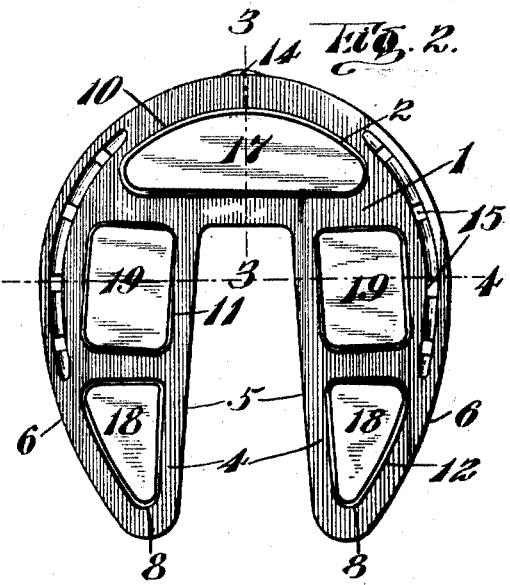
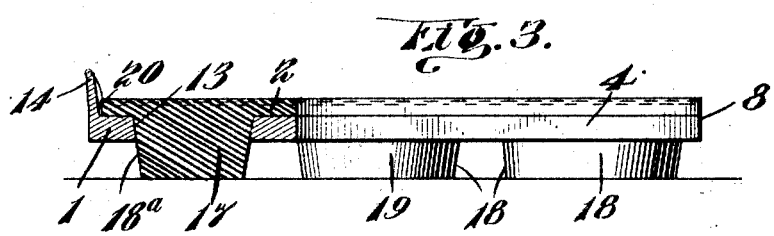
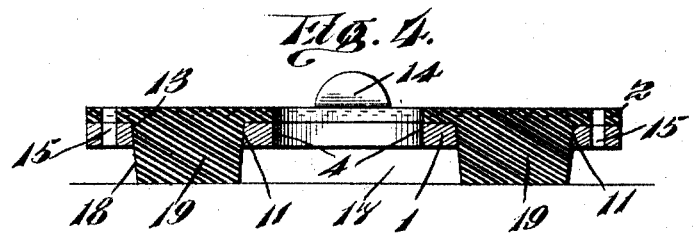
Witnesses
Eugene M Sliney
C. H. Griesbauer
Inventor
I. G. Howell
by H. B. Wilson
Attorney No. 777,022. Patented December 6, 1904.

UNITED STATES PATENT OFFICE.

ISRAEL G. HOWELL, OF HOPEWELL, NEW JERSEY.

HORSESHOE.

SPECIFICATION forming part of Letters Patent No. 777,022, dated December 6, 1904.

Application filed July 11, 1904. Serial No. 216,139. (No model.)

*To all whom it may concern:*

Be it known that I, ISRAEL G. HOWELL, a citizen of the United States, residing at Hopewell, in the county of Mercer and State of New Jersey, have invented certain new and useful Improvements in Horseshoes; and I do declare the following to be a full, clear, and exact description of the invention, such as will enable others skilled in the art to which it appertains to make and use the same.

My invention relates to improvements in elastic or cushioned horseshoes; and it consists in certain novel features of construction, combination, and arrangement of devices, as will be hereinafter more fully described, and particularly pointed out in the appended claim.

The object of my invention is to provide a simple, comparatively inexpensive, durable, and efficient device of this character which will take all jar from the limbs of the animal and prevent slipping on any kind of surface.

The above and other objects, which will appear as my invention is better understood, I accomplish by the construction illustrated in the accompanying drawings, in which—

Figure 1 is a top plan view of my improved horseshoe. Fig. 2 is a bottom plan view of the same. Fig. 3 is a vertical sectional view taken on the line 3 3 of Fig. 2, and Fig. 4 is a transverse sectional view taken on the line 4 4 of Fig. 2.

Referring to the drawings by numeral, 1 denotes the metal body portion of my improved horseshoe, and 2 the pad or cushion of rubber or other elastic material. Said metal body 1 is flat and conforms to the shape of the hoof of the animal to which it is applied. It is preferably made of malleable iron, and its central opening or recess 3 is substantially U shape in form, so that the two arms or sides 4 of the shoe have spaced inner edges 5 and curved outer edges 6, the ends of the said arms or sides being formed with rounded points 8, forming the heels of the shoe. In the said metal body portions of the shoe is formed a series of openings 10, 11, and 12, the opening 10 being disposed at the front or toe portion of the shoe and substantially elliptical in shape, the opening 12 being disposed at the heel portion of the shoe and of substantially triangular shape, and the opening 11 being disposed intermediate said openings 10 and 12 and of substantially rectangular shape. Each of the said openings is large in size and has its walls inclined, as at 13, so that its upper end is of greater width or diameter than its lower end.

Upon the upper side of the metal body 1, at the center of its front or toe portion, is formed an upwardly-projecting toe-clip 14, which is adapted to engage the front portion of the hoof of the animal, and thus remove a portion of the strain from the nails which secure the shoe to the hoof. Said attaching-nails are passed through nail-holes 15, arranged in each of the sides of the shoe adjacent to its outer edge in a well-known manner.

The cushion or pad 2 comprises a flat body portion 16, which conforms in shape to that of the metal body portion of the shoe and which is adapted to be placed upon the upper side of the same. Said body portion is formed upon its under side with depending calks 17, 18, and 19, which conform in shape to the openings 10, 11, and 12, through which they project, as shown in the drawings. Said calks are tapered downwardly, as shown at 18, so that they wedge into the said openings. The body portion of the pad or cushion has embedded in its upper side one or more layers of canvas or other suitable fabric, which materially strengthens the pad or cushion. Said body portion of the pad is also formed with a series of nail-holes in the metal portion of the shoe, so that when the pad is placed upon the metal body the attaching-nails may be driven through both of them to secure the shoe firmly upon the hoof. The front of the body portion is recessed, as shown at 20, in order to fit the outwardly-projecting toe-clip upon the metal body portion of the shoe.

From the foregoing description, taken in connection with the accompanying drawings, it is thought the construction, operation, and advantages of my invention will be readily seen without a more extended explanation. It will be observed that my shoe will remove all jar from the limbs and shoulders of the animal and that an easy, noiseless, and sure tread will be provided.

Various changes in the form, proportion, and the minor details of construction may be resorted to without departing from the principle or sacrificing any of the advantages of this invention.

Having thus described my invention, what I claim, and desire to secure by Letters Patent, is—

A horseshoe comprising a flat metal body formed with large openings having inclined walls and with an upwardly-projecting toe-clip at its front and a flat cushion or pad of elastic material conforming in contour to said metal body, upon the upper face of which it is arranged, and having depending tapered integral calks extending through said openings and projecting below the lower surface of said metal body, said pad having its front portion recessed to receive said toe-clip, and said metal body and pad having alining nail-holes formed along each of their sides, substantially as described.

In testimony whereof I have hereunto set my hand in presence of two subscribing witnesses.

ISRAEL G. HOWELL.

Witnesses:
 EDWIN C. LONG,
 CHARLES L. CONARD.